(12) United States Patent
Sluiter et al.

(10) Patent No.: US 7,866,087 B2
(45) Date of Patent: Jan. 11, 2011

(54) METHOD FOR REPOTTING PLANTS, AS WELL AS A PLANTING HEAD AND AN APPARATUS PROVIDED WITH A PLANTING HEAD

(75) Inventors: Jan Nicolaas Hendrik Sluiter, Opheusden (NL); Arie Dirk Van Malsen, Lunteren (NL)

(73) Assignee: Sluiter Techniek B.V., Opheusden (NL)

( * ) Notice: Subject to any disclaimer, the term of this patent is extended or adjusted under 35 U.S.C. 154(b) by 131 days.

(21) Appl. No.: 12/372,606

(22) Filed: Feb. 17, 2009

(65) Prior Publication Data

US 2009/0205250 A1 Aug. 20, 2009

(30) Foreign Application Priority Data

Feb. 18, 2008 (NL) .................................. 1035036

(51) Int. Cl.
*A01G 9/08* (2006.01)
(52) U.S. Cl. .................................................... 47/1.01 P
(58) Field of Classification Search .................. 47/901; 111/101
See application file for complete search history.

(56) References Cited

U.S. PATENT DOCUMENTS

| | | | | |
|---|---|---|---|---|
| 5,054,831 A | * | 10/1991 | Ting et al. ....................... | 294/61 |
| 5,247,761 A | * | 9/1993 | Miles et al. ................ | 47/1.01 R |
| 5,353,723 A | * | 10/1994 | Tesch et al. .................. | 111/105 |
| 5,842,306 A | * | 12/1998 | Onosaka et al. .......... | 47/1.01 R |
| 5,911,631 A | | 6/1999 | Bouldin et al. | |
| 2009/0205250 A1 | * | 8/2009 | Sluiter et al. .................... | 47/73 |

FOREIGN PATENT DOCUMENTS

| | | | |
|---|---|---|---|
| EP | 1 230 838 A1 | | 8/2002 |
| JP | 9-226934 | | 9/1997 |
| JP | 9226934 | * | 9/1997 |
| JP | 11318222 A | * | 11/1999 |
| JP | 20022305985 A | * | 10/2002 |
| NL | 8800040 | | 8/1989 |
| NL | 8802151 | | 3/1990 |
| NL | 1001461 | | 11/1996 |
| WO | 86/01975 | | 4/1986 |

* cited by examiner

*Primary Examiner*—Francis T Palo
(74) *Attorney, Agent, or Firm*—Shewchuk IP Services, LLC; Jeffrey D. Shewchuk

(57) ABSTRACT

Plants are repotted by moving a rootball from a first rootball container to a second rootball container using a planting head. The planting head has legs with pins which may be in a first retracted position or in a second extended position.

In a first step the planting head is brought above the rootball surface.

In a second step the distance of the distal ends of the legs to the central axis of the planting head is reduced.

In a third step the pins are inserted into the rootball.

In a fourth step the distal ends of the legs are brought closer together.

Then the rootball is taken out of the first rootball container and deposited into the second rootball container. The invention also relates to an apparatus for carrying out the method.

15 Claims, 8 Drawing Sheets

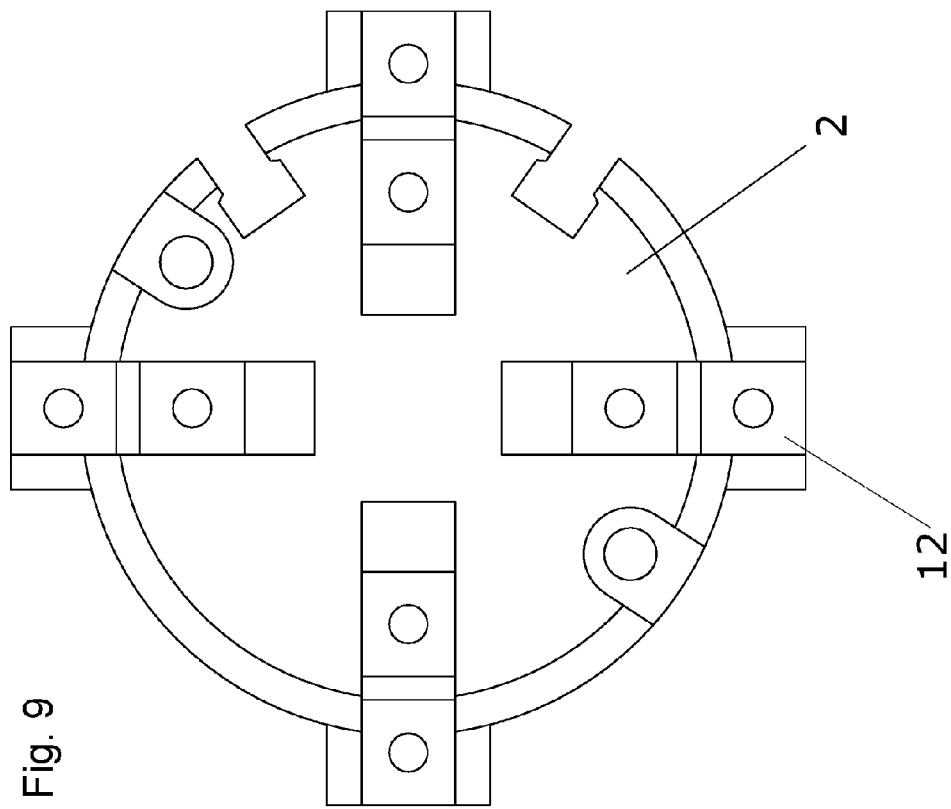
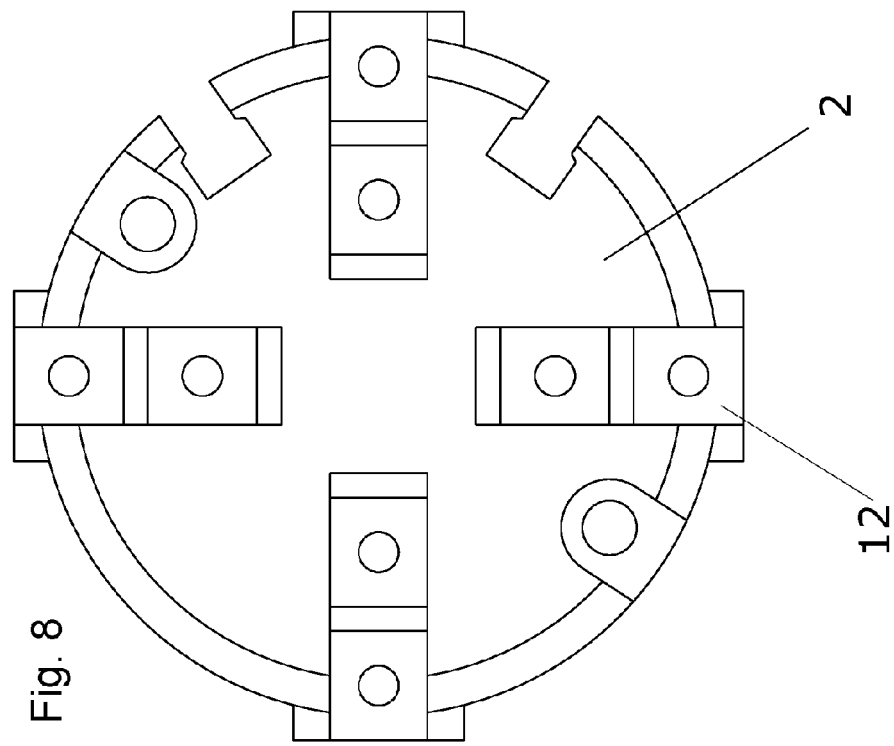

US 7,866,087 B2

METHOD FOR REPOTTING PLANTS, AS WELL AS A PLANTING HEAD AND AN APPARATUS PROVIDED WITH A PLANTING HEAD

BACKGROUND OF THE INVENTION

The present invention relates to a method for repotting plants, wherein a rootball provided with a plant is moved from a first rootball container to a second rootball container using a planting head.

Traditionally, the repotting of plants has been done manually. In doing so, the plant itself is held and the plant including rootball is lifted from the rootball container (such as a pot or recess in a tray), and is the rootball is transferred to another container (for instance a larger pot). It goes without saying that this is labor intensive work and thus expensive, for which reason it has been attempted to carry out the repotting mechanically, wherein not the plant but the rootball is held by means of pins which protrude into the rootball.

A disadvantage of the known method is that for a variety of plant species (like *Gerbera*, Zinnia, Begonia, *Geranium*), the damage to the above-ground plant parts may be greater than desired. The damage to the plant may adversely affect the market value. Reliably transferring and avoiding damage are somewhat at odds with each other. If the rootballs are not transferred reliably, that is to say if some of the rootballs are left behind in the first rootball containers, the saving of work will be partly made undone because then a person is needed to still transfer the rootballs that have not been picked up successfully.

SUMMARY OF THE INVENTION

The present invention aims to provide a method with which rootballs can be transferred with great reliability, wherein the risk of damage to the above-ground parts of the plant is reduced.

To this end the present invention provides a method for repotting plants, wherein a rootball provided with a plant is moved from a first rootball container to a second rootball container using a planting head, the planting head has a planting head body with legs said legs near the proximal ends thereof being connected to the planting head body, and near the distal ends thereof are provided with pins which may be in a first retracted position and in a second extended position, wherein in a first step of gripping the rootball, the planting head is brought above the rootball surface in a relative manner, such that at least 1 of the legs of the planting head is positioned outside the rootball, and the distal ends of the legs are situated near the highest of the top edge of the rootball container and the rootball surface;

in a second step of gripping the rootball, the distance of the distal ends of the legs to the central axis of the planting head is reduced such that the legs of the planting head point towards the rootball and at a distance of both the upper circumferential edge of the rootball as well as the central axis of the rootball will intersect the rootball surface;

in a third step of gripping the rootball, the pins are brought from the first retracted position to the second extended position as a result of which the pins extend into the rootball;

in a fourth step of gripping the rootball the distal ends of the legs are brought closer together;

after which the rootball is taken out of the first rootball container and deposited into the second rootball container.

In the applicant's greenhouse it has been established that with the method rootballs can be reliably transferred and that it is absolutely not necessary to employ a person for manually transferring plants that were left behind—i.e. not mechanically repotted—, since the rootballs had been entirely, reliably transferred. Not only do steps 1 and 2 contribute to reliably gripping the rootball, but also to reducing the likelihood of damage to above-ground parts of the plants situated near the rootball surface, such as leaves. In the present application with the term "rootball surface" the substrate surface that is located at the side of the above-ground plant parts is meant. The substrate itself can be an artificial substrate or a natural substrate, for instance soil. Where in the present application reference is made to bringing the planting head above the rootball, then this is understood to mean that the central axis of the planting head is brought near the central axis of the rootball, and that the planting head is situated at the side of the above-ground plant parts with respect to the rootball surface. The direction of the central axis of the rootball is in general substantially the same as the direction of the central axis of the first rootball container. When carrying out the procedure according to the invention the central axes of the planting head and the plant containers generally run substantially vertically, however, this is not a requirement. Within the scope of the present application, in the scope of carrying out movements the term "in a relative manner" is understood to mean that either one of the planting head and the rootball container is moved or both are moved. By way of example, the phrase "the planting head is brought above the rootball surface" includes any of the following possibilities: i) moving the planting head without moving the rootball container, ii) moving the rootball container without moving the planting head, and iii) moving both the planting head as well as the rootball container. Bringing the distal ends of the legs of step 4 closer together also brings the distal ends of the pins closer together, or even against each other. By way of example, the legs and thus the pins can be tilted as a result of which the distal ends of the legs and consequently the distal ends of the pins get closer together. For transferring the rootball, the planting head will be brought above the second rootball container in a relative manner. After depositing in the second rootball container, the pins are retracted from the rootball and preferably steps 4 and 3 and optionally also 2 and/or 1 in (as herein mentioned) reverse order (4, 3, 1 or preferably 4, 3, 2, 1) will be carried out. When the phrase "the distal ends of the legs are situated near the highest of the top edge of the rootball container and the rootball surface" is mentioned, then a height is meant that is such that during the movement of the distal ends of the legs in the step that follows, this movement of the distal ends of the legs is not blocked by the top edge of the rootball container or the rootball. In step 1 all legs are preferably placed outside the rootball. In other words, the extension of each leg does not intersect the rootball surface.

A preferred embodiment is characterized in that for carrying out at least the final part of the movement of the first step, the distal ends of the legs each follow a trajectory of which the tangent is at an angle of less than 5° to a plane perpendicular to the central axis of the first rootball container.

Thus, above-ground plant parts which extend beyond the legs are already pushed to the side when bringing the planting head near the rootball. The final part is in practice at least 2 cm. The final part of the movement is for round rootball containers preferably at least ⅔ of the diameter of the rootball surface and for rectangular rootball containers wherein the planting head travels parallel with respect to one of the sides equal to the length of that side.

Preferably the planting head has 3 and more preferably 4 legs.

This number of legs allows for an optimal reliability of the transfer combined with minimal damage to above-ground plant parts.

An advantageous embodiment is characterized in that the movement of the legs in the direction of the central axis of the planting head in the second step takes place by having the legs rotate around the proximal rotation axes, wherein a proximal rotation axis of a leg is at an angle with the normal of a plane defined by the central axis of the planting head and the location where the leg is connected to the planting head body, which angle does not exceed 5°.

Because of the slight angle, the odds are small that a distal end of a leg, and therewith of a pin, will appear above an above-ground plant part such as a leaf, which in that case would otherwise be pierced by the pin. Anywhere in the application where this angle is mentioned, this angle is preferably about 2° at the most, or smaller. For the best results an angle of about 0° is optimal.

An important embodiment is characterized in that after transferring the rootball, the pins are moved from the second extended position to the first retracted position, subsequently at least 1 of the legs of the planting head is rotated around the rotation axis thereof to outside the rootball before the planting head is moved away from the second rootball container in a relative manner.

In contrast to a known method, the odds that a rootball that is deposited in the second rootball container is lifted from the rootball container again or ends up askew because the rootball was still lifted at 1 side, is herewith effectively reduced. It goes without saying that preferably all legs are brought outside the rootball.

Preferably, the proximal rotation axes of the legs are situated at a distance from the rootball surface of at least 2 times the average width of the rootball surface, and preferably at least 4 times.

Thus, during carrying out the second step the height of the distal ends of the legs will not change much, reducing the odds that a leg appears above a leaf or in that it runs stuck in the rootball surface.

The present invention also relates to a planting head that is suitable for carrying out the procedure of the method according to the invention.

Preferably the planting head comprises a planting head body provided with legs, wherein at least one leg of the planting head body near the proximal end of the at least one leg is, relative to the central axis of the planting head body movably connected to the planting head body in such a way that the distance to the central axis can be increased and decreased, the at least one leg near the proximal end thereof is rotatable around a proximal rotation axis of the at least one leg, which rotation axis is at an angle with the normal of a plane defined by the central axis of the planting head and the location where the leg is connected to the planting head body, which angle does not exceed 5°;

the at least one leg at the distal end thereof is provided with a pin which can be brought from a first retracted position to a second extended position (vice versa), the at least one leg between the proximal and the distal end thereof is provided with a guiding organ, wherein the guiding organ in the situation where the guiding organ and the leg engage can move relative with respect to the particular at least one leg, and the at least one leg further is rotatable around a second rotation axis relative to the guiding organ, wherein the second rotation axis is at an angle with the normal of a plane defined by the central axis of the planting head and the location where the leg is connected to the planting head body which angle does not exceed 5°, the guiding organ is located at a fixed distance relative to the central axis of the planting head, wherein the distance of the proximal rotation axis to the central axis of the planting head differs from the distance between the second rotation axis and the central axis of the planting head, and the guiding organ of the at least one leg is movable parallel with respect to the central axis of the planting head relative to the planting head body.

This planting head has demonstrated that the method according to the invention in practice functions superbly. Preferably, all legs are provided with a pin. Preferably, all legs are provided with a guiding organ. The second rotation axis will run parallel to the first rotation axis.

Preferably, the at least one leg is hollow and houses the pin.

This gives the at least one leg great strength while at the same time it provides a location for the pin.

Herewith, the at least one leg comprises a cylinder at the proximal end and the pin is situated at the end of a piston rod for the cylinder.

Thus, the soiling of the cylinder is avoided to a large extent.

For a simple and reliable construction it is preferred that there are at least two legs each having a guiding organ, which guiding organs are connected with each other via a base.

For a reliable operation it is preferred that the planting head body is arranged for moving by means of a pressure medium at least 1 of a) a proximal end of a leg relative to the planting head body, b) bringing a pin from the first retracted position to the second extended position, and c) the parallel movement of the guiding organs along the central axis of the planting head.

The pressure medium is for instance air (pneumatic drive) or oil (hydraulic drive).

Finally the invention relates to an apparatus which comprises a planting head according to the invention, as well as a carrier for a rootball container wherein an organ is provided for moving relative to each other of the planting head and the carrier for the rootball container between a first position and a second position, wherein in the first position the distance between the planting head and the carrier for the rootball container is relatively small and in the second position the distance between the planting head and the carrier for the rootball container is relatively large.

BRIEF DESCRIPTION OF THE DRAWINGS

The present invention will now be illustrated with reference to the drawings, where

FIG. 8 and 9 show the underside of a commercially obtainable component of the planting head body in two positions.

DETAILED DESCRIPTION

Figure 1:
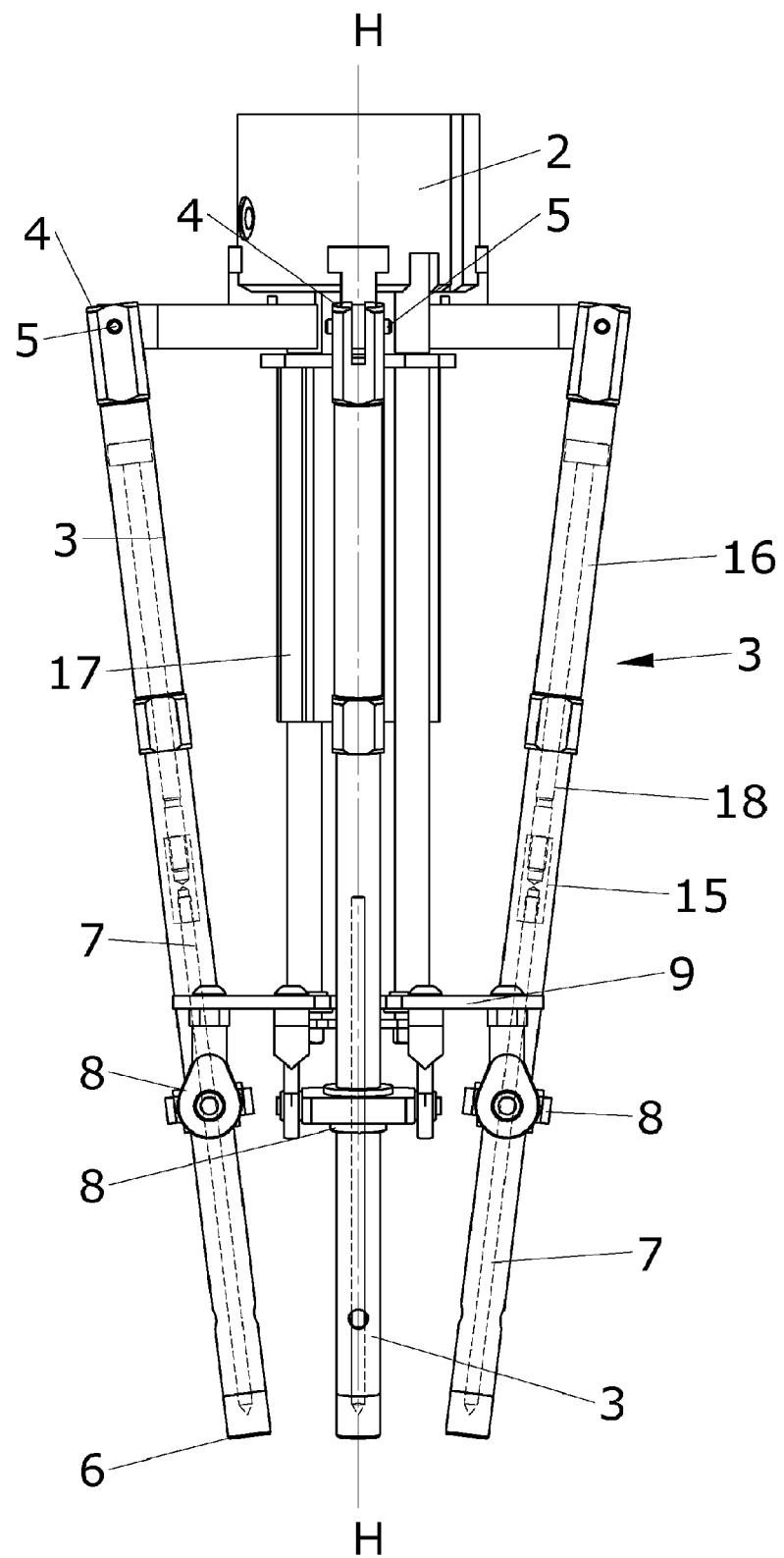
FIG. 1 is a schematic side view of a planting head.

FIG. 1 shows a planting head 1 for transferring a rootball from a first rootball container to a second rootball container, for instance from a small pot or recess in a tray to a larger pot. The planting head 1 comprises a planting head body 2 that is provided with legs 3. The depicted planting head 1 has four legs 3, three of which are visible in FIG. 1. Near the proximal ends 4 thereof the legs 3 are rotatable, relative to the planting head body 2, around respective axes 5 which are perpendicular to a plane defined by the central axis H through the planting head body 2 and the location where the particular leg 3 is connected to the planting head body 2.

The legs 3 have distal ends 6 which are located away from the planting head body 2. In the embodiment shown, the legs 3 comprise at the proximal side thereof cylinders 16 and these are provided with piston rods 18 (FIG. 7) which at the distal ends thereof are provided with pins 7 by means of a junction box 15, which pins—as explained hereinafter—will be inserted into the rootball. In the embodiment described here, the pins 7 have a round cross section with a diameter of 3 mm.

The piston rods 18 and therewith the pins 7 are movable between a first position in which the pins 7 are at least partially or even entirely taken up in the legs 3, and a second position in which they are slid out.

The legs 3 are movably received in guiding boxes 8. The guiding boxes 8 are, with respect to a plateau 9, rotatably connected to the plateau 9. The rotation axis (in the claims designated by second rotation axis) runs parallel to the axis 5 of the same leg 3. The plateau 9 is movable in the direction of the central axis H of the planting head 1 between a first position of the plateau 9 near the planting head body 2 and a second position of the plateau 9 at a larger distance of the planting head body 2. When the distance of the guiding boxes 8 to the central axis H differs from the distance of the axes 5 to the central axis H, the movement from the first position of the plateau 9 to the second position of the plateau 9 (vice versa) will result in a tilting of the legs 3, and consequently of the pins 7. Moving the plateau 9 can be realized in a simple manner by using a pneumatic cylinder 17 between both positions, as needs no further elucidation for the person of ordinary skill in the art.

The axes 5 are displaceable in a radial direction relative to the central axis H. In this way also, the legs 3 and therewith the pins 7 can be tilted.

Now the method for transferring a rootball K from a first rootball container P, here in the form of a recess in a tray, to a second rootball container (not represented) will be described, wherein in this case use is made of the planting head 1 as described above.

In a first step (FIG. 2) the planting head 1 is brought above the first rootball container P (not shown in FIG. 2), wherein the distal ends 6 of the legs 3 in the preferred embodiment as illustrated here are all situated outside the circumference of the rootball K. The lowermost ends of the legs 3, which may be formed by the distal ends of the pins 7 in case these still protrude somewhat in the retracted position, are allowed to be in a position that is lower than the rootball surface or the top edge of the rootball container P, as long as they can be brought above the rootball surface without being hindered by the rootball surface or the top edge of the rootball container P (FIG. 3). Said lower ends may also be in a position that is higher than the rootball surface, however, it will be obvious that the greater the distance, the bigger the risk that an above-ground plant part will not be pushed aside by the legs 3/the pins 7 and that there is, thus, a larger risk that the particular plant part will be damaged. A suitable height will depend on the particular plant species, and the ordinary person skilled in the art will have no difficulty with setting a suitable height depending on the plant species and the type of rootball container that is used. For carrying out the second step, the legs 3 are tilted by moving the plateau 9 from its second position to the first position of the plateau 9. In the third step (FIG. 4) the piston rods 18 and therewith the pins 7 are moved from the first retracted position to the second slid out position.

Figure 5:
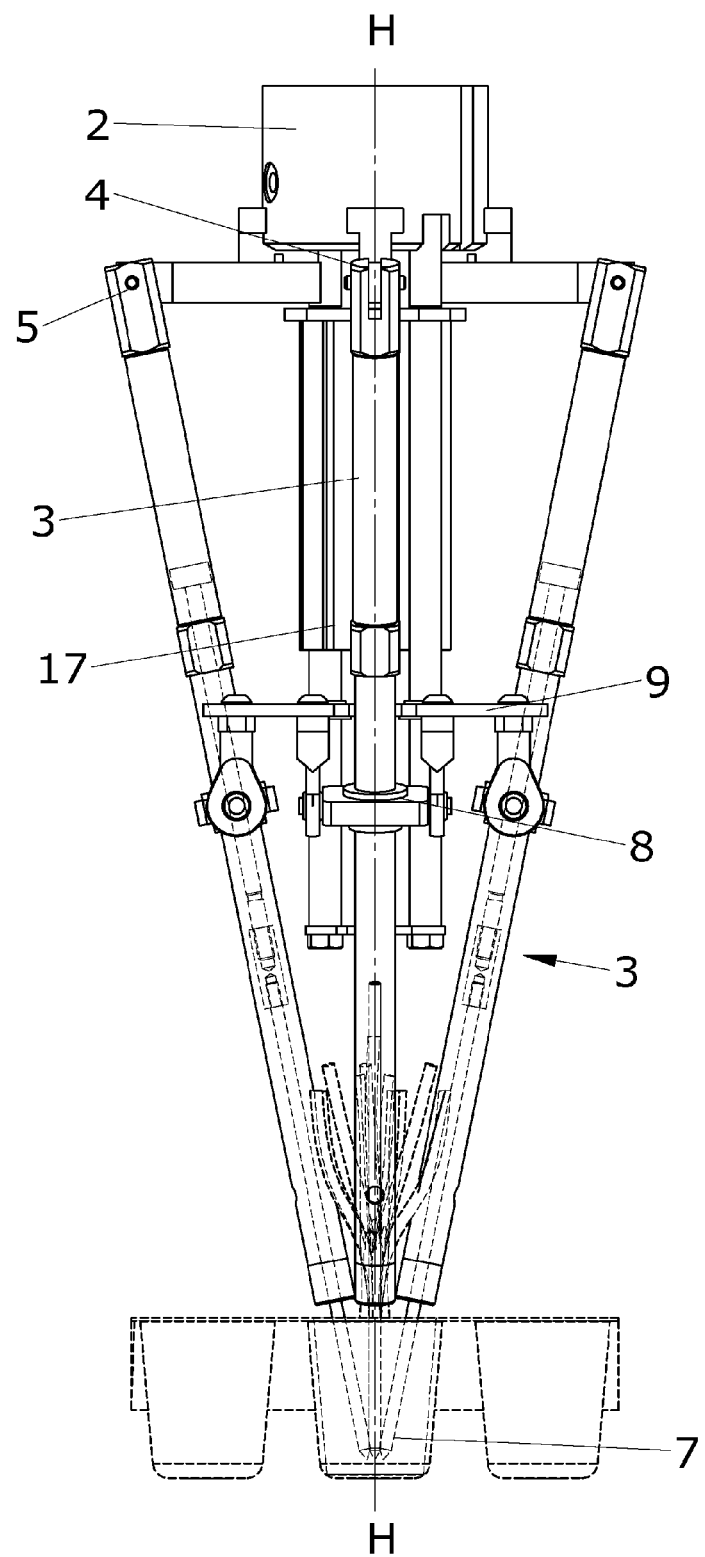

Since the above-ground plant parts will most probably have been pushed inward by the legs 3, the odds that these plant parts are damaged when inserting the pins 7 into the rootball K, is reduced. In the fourth step (FIG. 5) the distance of the axes 5 to the central axis H is increased which also results in a tilting of the legs 3, as a result of which the distal ends of the pins 7 come closer together and the likelihood that the rootball K escapes from the grip of the planting head 1 when the rootball K is taken from the rootball container P is minimal. For increasing and decreasing the distance of the axes 5 to the central axis in radial direction, the planting head body 2 preferably comprises an MHS4-32 (SMC Pneumatics BV, Amsterdam, The Netherlands) as actuator.

When lifting the rootball K from the first rootball container P, the rootball will—in particular if for instance the roots are stuck in a hole in the bottom of the rootball container P, exert a force on the pins 7. Therefore, preferably a counterforce is exerted by the actuator when the rootball is taken from the container, which counterforce keeps the distal ends of the pins 7 in place, which counterforce is at least as strong as the largest force that was necessary for making the pins 7 move toward each other in the fourth step, and preferably a counterforce that is at least twice as strong. In general, in this phase the piston heads 16' of the cylinders 16 also continuously exert a force on the pins 7 (so as of step 3 until pulling the pins 7 from the rootball K).

Figure 6:
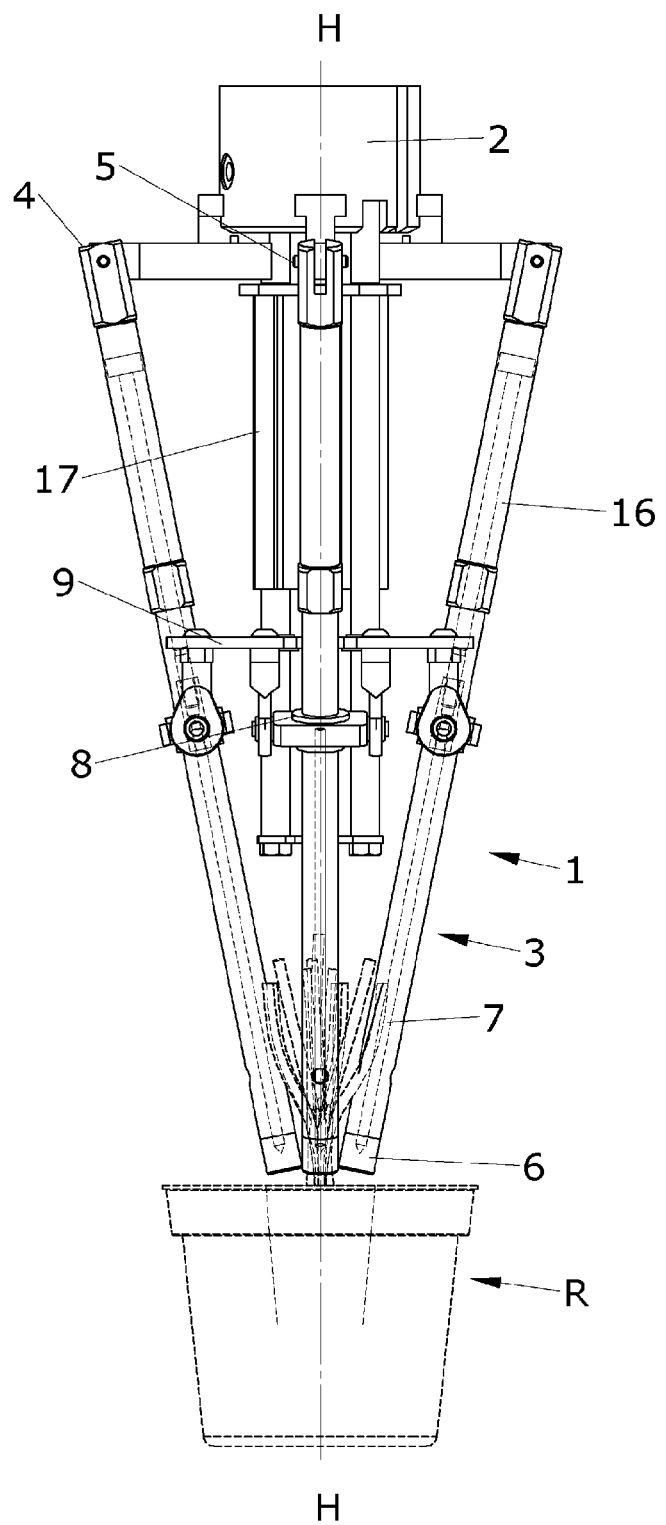

FIG. 6 shows the situation where the rootball K has been transferred into a larger rootball container (here in the form of a pot), and the pins 7 are retracted. Now, the most favourable step is to re-open the legs 3 to take the position as shown in FIG. 2, and subsequently to remove the planting head 1 from the larger rootball container by means of a relative movement.

Figure 2:
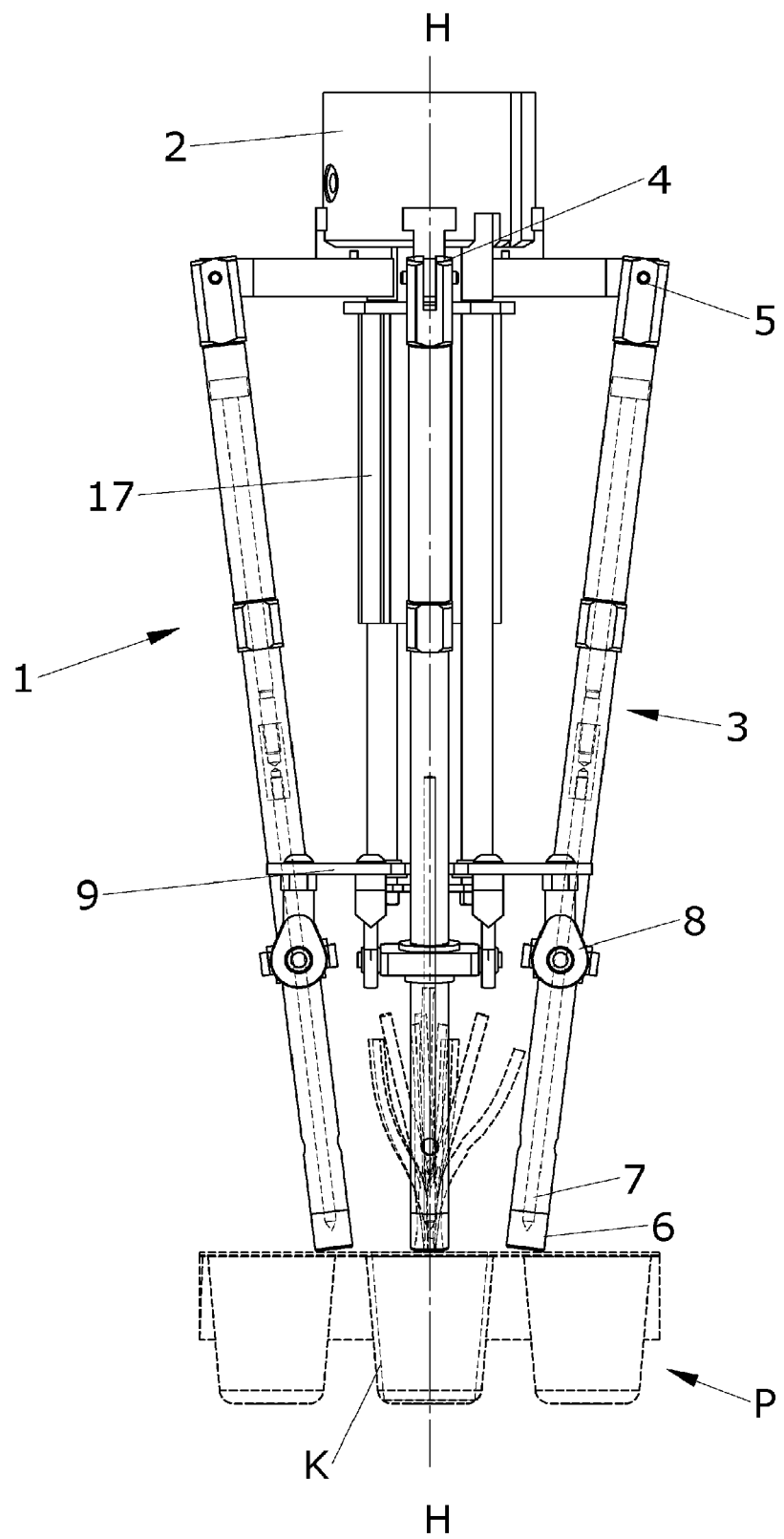
FIG. 2-6 show the steps of transferring a rootball using the planting head of FIG. 1.
Figure 3:
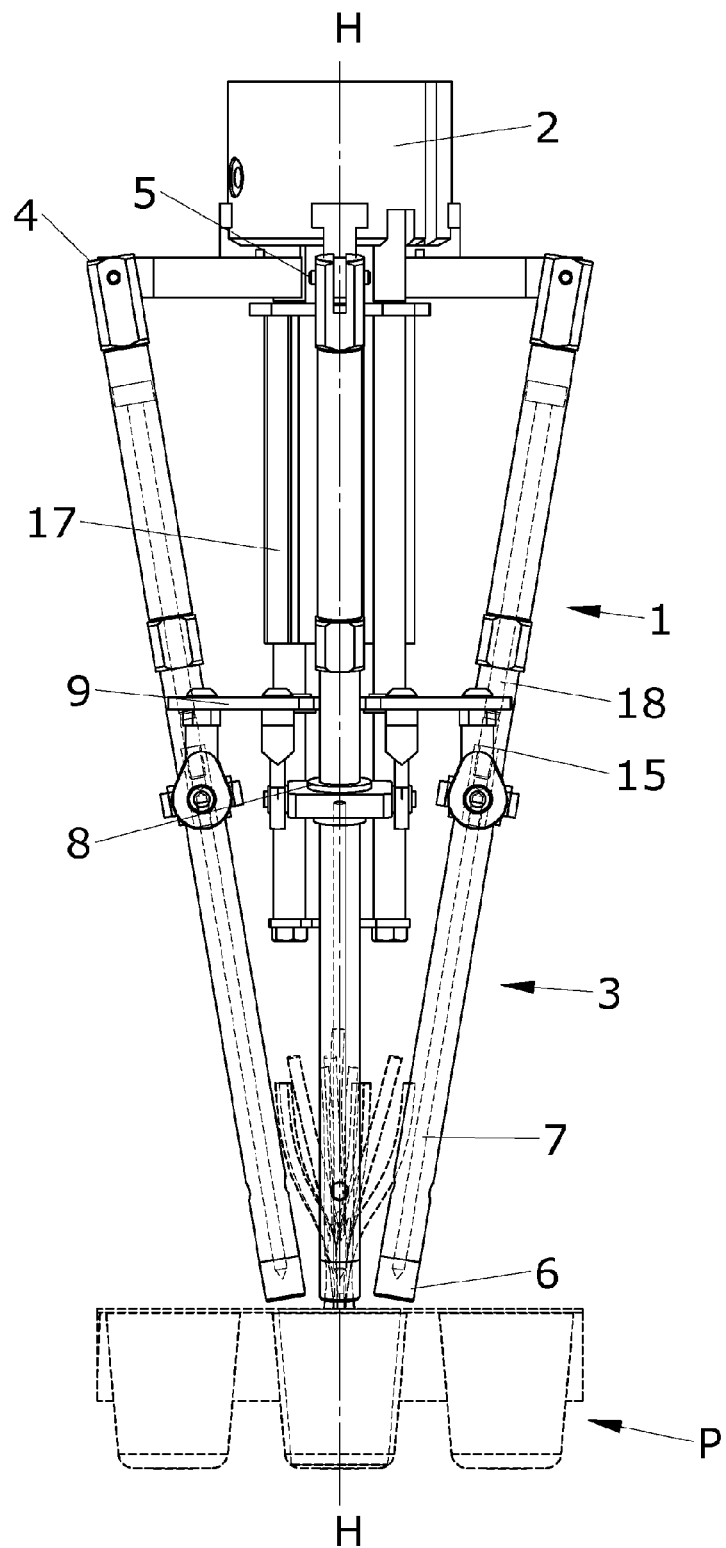
Figure 4:
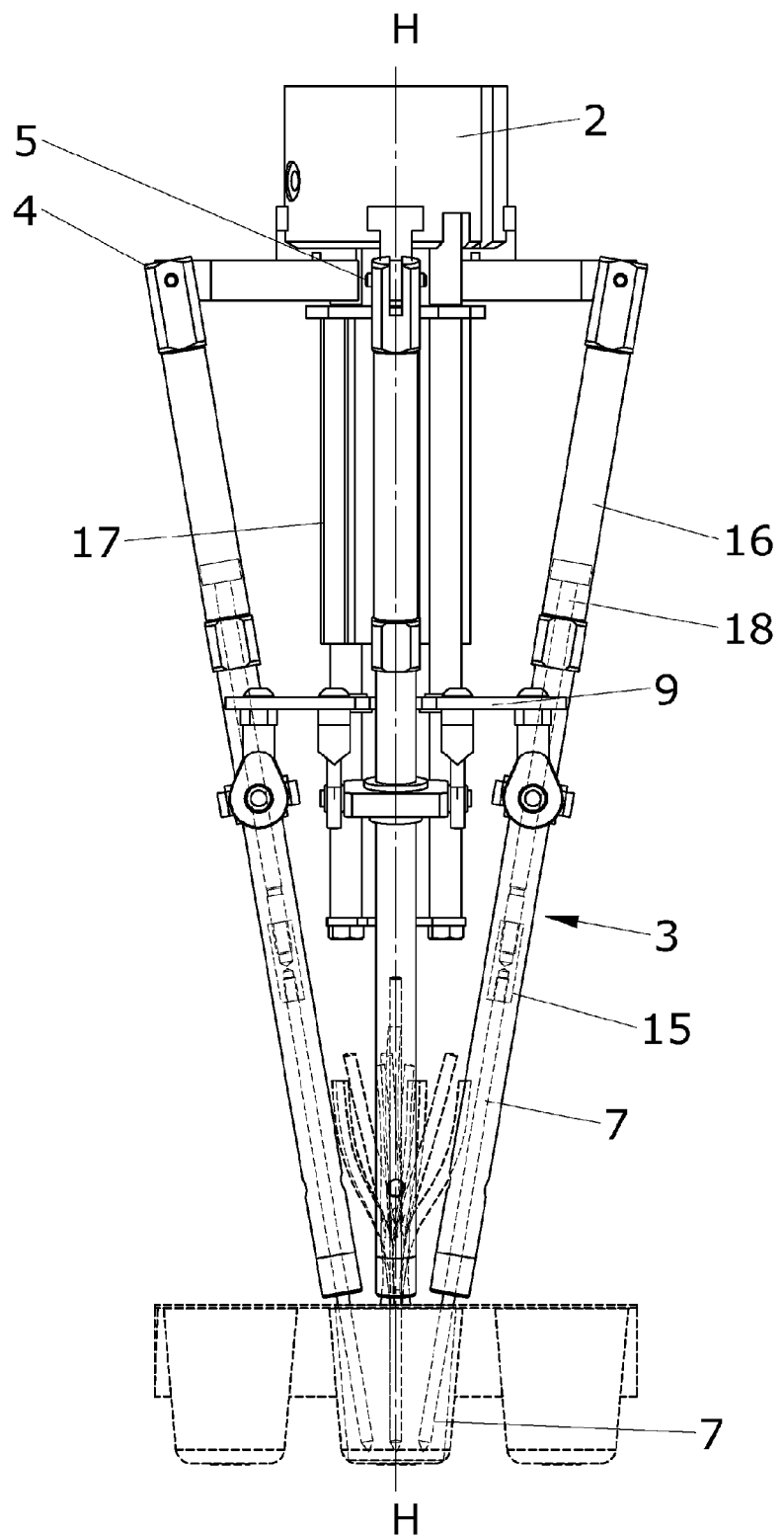
Figure 7:
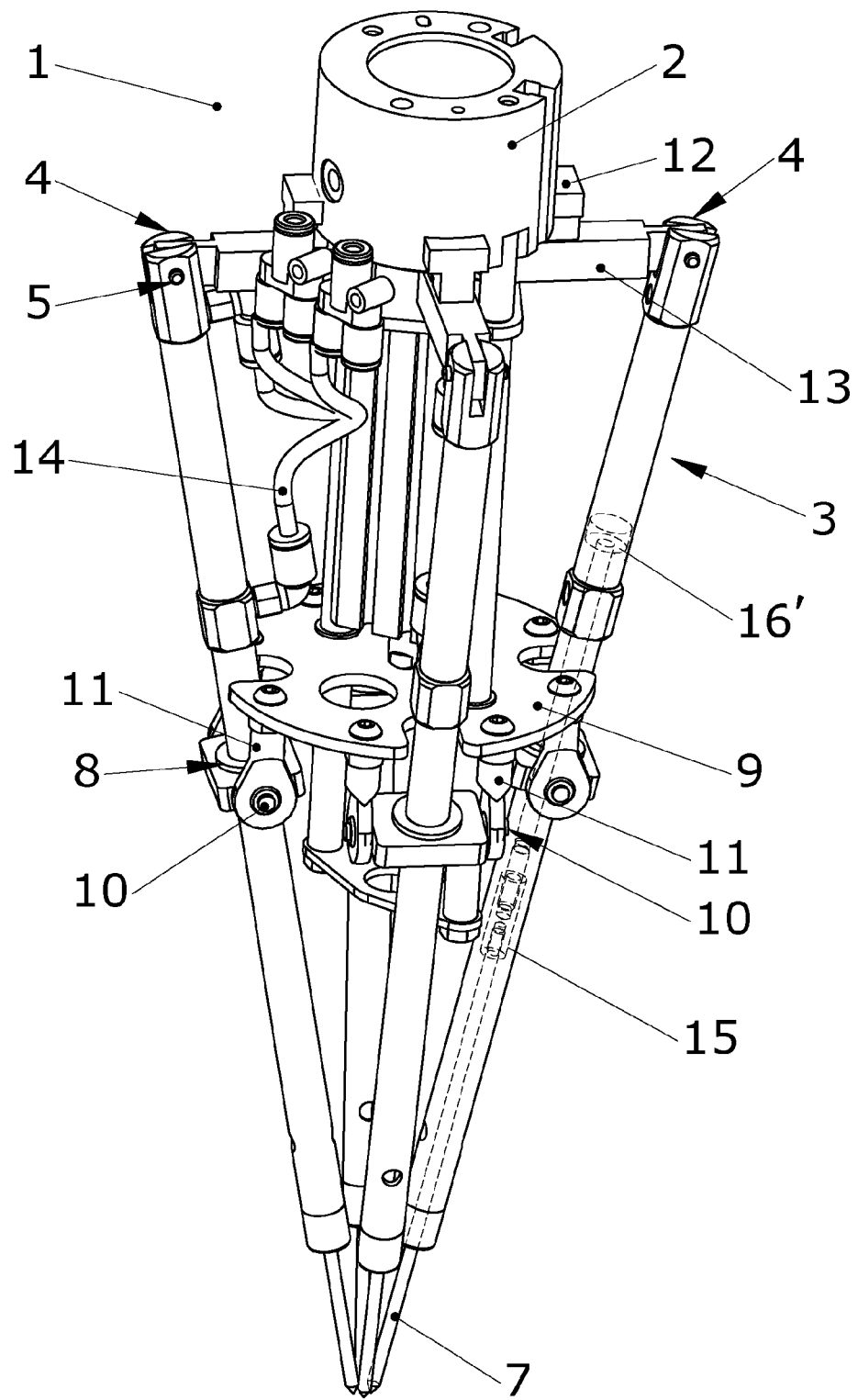
FIG. 7 is a detailed perspective view of the planting head of FIG. 1.

Now, the planting head which is schematically shown hereabove in FIG. 1 and whose operation has been disclosed in FIGS. 2 to 6, will be further illustrated through FIG. 7 shown in perspective, and in more detail. The hereinbefore already mentioned parts have the same reference numerals and need no further elucidation. The boxes 8 are rotatably connected to the plateau 9 around axes 10 via arms 11. When the distance of an axis 10 to the central axis H and the distance of an axis 5 to the central axis H is not equal, the movement of the plateau 9 along the central axis H will cause the distal ends of the legs 3 to move away from each other or move towards each other. This movement is used at the transition from the situation as shown in FIG. 2 to the situation shown in FIG. 3. The cylinders 16 of the legs 3 are powered using a pressure medium such as compressed air, which compressed air is supplied via conduits (1 of which is shown and designated by reference numeral 14).

For bringing the distal ends of the pins 7 (FIGS. 4 and 5) closer together, in the embodiment described here, use is made of a planting head body 2 in the form of an actuator MHS4-32 (SMC Pneumatics BV, Amsterdam, The Netherlands). This actuator has four arms 12 which are movable in radial direction. FIGS. 8 and 9 show the actuator (planting head body 2) in a bottom view in respectively a first position (FIG. 8) in which the arms 12 are retracted, and a second position (FIG. 9) in which they are slid out. The arms 12 are connected to the proximal ends 4 of the legs 3 via extension arms 13 (FIG. 7).

The invention claimed is:

1. Method for repotting plants, wherein a rootball provided with a plant is moved from a first rootball container to a second rootball container using a planting head, the planting head has a planting head body with legs said legs near the proximal ends thereof being connected to the planting head body, and near the distal ends thereof are provided with pins which may be in a first retracted position and in a second extended position, wherein in a first step of gripping the rootball, the planting head is brought above the rootball surface in a relative manner, such that at least 1 of the legs of the planting head is positioned outside the rootball, and the distal ends of the legs are situated near the highest of the top edge of the rootball container and the rootball surface;

in a second step of gripping the rootball, the distance of the distal ends of the legs to the central axis of the planting head is reduced such that the legs of the planting head point towards the rootball and at a distance of both the upper circumferential edge of the rootball as well as the central axis of the rootball will intersect the rootball surface;

in a third step of gripping the rootball, the pins are brought from the first retracted position to the second extended position as a result of which the pins extend into the rootball;

in a fourth step of gripping the rootball the distal ends of the legs are brought closer together;

after which the rootball is taken out of the first rootball container and deposited into the second rootball container.

2. Method according to claim 1, wherein for carrying out at least the final part of the movement of the first step, the distal ends of the legs each follow a trajectory of which the tangent is at an angle of less than 5° to a plane perpendicular to the central axis of the first rootball container.

3. Method according to claim 1, wherein the planting head comprises three legs.

4. Method according to claim 1, wherein the movement of the legs in the direction of the central axis of the planting head in the second step takes place by having the legs rotate around proximal rotation axes, wherein a proximal rotation axis of a leg is at an angle with the normal of a plane defined by the central axis of the planting head and the location where the leg is connected to the planting head body which angle does not exceed 5°.

5. Method according to claim 4, wherein after transferring the rootball, the pins are moved from the second extended position to the first retracted position, subsequently at least one of the legs of the planting head is rotated around the rotation axis thereof to outside the rootball before the planting head is moved away from the second rootball container in a relative manner.

6. Method according to claim 4, wherein the proximal rotation axes of the legs are situated at a distance from the rootball surface of at least two times the average width of the rootball surface.

7. Planting head suitable for carrying out the procedure according to claim 1.

8. Planting head according to claim 7, which planting head comprises a planting head body provided with legs, wherein
at least one leg of the planting head body near the proximal end of the at least one leg is, relative to the central axis of the planting head body movably connected to the planting head body in such a way that the distance to the central axis can be increased and decreased,
the at least one leg near the proximal end thereof is rotatable around a proximal rotation axis of the at least one leg, which rotation axis is at an angle with the normal of a plane defined by the central axis of the planting head and the location where the leg is connected to the planting head body, which angle does not exceed 5°;
the at least one leg at the distal end thereof is provided with a pin which can be brought from a first retracted position to a second extended position,
the at least one leg between the proximal and the distal end thereof is provided with a guiding organ, wherein the guiding organ in the situation where the guiding organ and the leg engage can move relative with respect to the particular at least one leg, and the at least one leg further is rotatable around a second rotation axis relative to the guiding organ, wherein the second rotation axis is at an angle with the normal of a plane defined by the central axis of the planting head and the location where the leg is connected to the planting head body which angle does not exceed 5°, the guiding organ is located at a fixed distance relative to the central axis of the planting head, wherein the distance of the proximal rotation axis to the central axis of the planting head differs from the distance between the second rotation axis and the central axis of the planting head, and the guiding organ of the at least one leg is movable parallel with respect to the central axis of the planting head relative to the planting head body.

9. Planting head according to claim 8, wherein the at least one leg is hollow and houses the pin.

10. Planting head according to claim 9, wherein the at least one leg comprises a cylinder at the proximal end, and the pin is situated at the end of a piston rod for the cylinder.

11. Planting head according to claim 8, wherein there are at least two legs each having a guiding organ, which guiding organs are connected with each other via a base.

12. Planting head according to claim 8, wherein the planting head body is arranged for moving by means of a pressure medium at least one of:
   a) a proximal end of a leg relative to the planting head body;
   b) bringing a pin from the first retracted position to the second extended position; and
   c) the parallel movement of the guiding organs along the central axis of the planting head.

13. Apparatus comprising a planting head according to claim 8, as well as a carrier for a rootball container wherein an organ is provided for moving relative to each other of the planting head and the carrier for the rootball container between a first position and a second position, wherein in the first position the distance between the planting head and the carrier for the rootball container is relatively small and in the second position the distance between the planting head and the carrier for the rootball container is relatively large.

14. Method according to claim 3, wherein the planting head comprises four legs.

15. Method according to claim 6, wherein the proximal rotation axes of the legs are situated at a distance from the rootball surface of at least four times the average width of the rootball surface.

* * * * *